(12) United States Patent
Shimazu et al.

(10) Patent No.: US 9,634,316 B2
(45) Date of Patent: Apr. 25, 2017

(54) LITHIUM ION SECONDARY BATTERY

(75) Inventors: Hiromi Shimazu, Tokyo (JP); Tomio Iwasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 329 days.

(21) Appl. No.: 14/354,900

(22) PCT Filed: Oct. 31, 2011

(86) PCT No.: PCT/JP2011/075026
§ 371 (c)(1),
(2), (4) Date: Apr. 28, 2014

(87) PCT Pub. No.: WO2013/065096
PCT Pub. Date: May 10, 2013

(65) Prior Publication Data
US 2014/0315090 A1    Oct. 23, 2014

(51) Int. Cl.
*H01M 4/131* (2010.01)
*H01M 4/1391* (2010.01)
(Continued)

(52) U.S. Cl.
CPC ......... *H01M 4/131* (2013.01); *H01M 4/0421* (2013.01); *H01M 4/1391* (2013.01);
(Continued)

(58) Field of Classification Search
CPC .. H01M 4/0426; H01M 4/0428; H01M 4/131; H01M 4/1391; H01M 4/525;
(Continued)

(56) References Cited

U.S. PATENT DOCUMENTS

2006/0141340 A1*  6/2006  Takeuchi ............ H01M 2/0285
                                                            429/52
2010/0242265 A1*  9/2010  Wadley .................. H01M 6/40
                                                            29/623.5
(Continued)

FOREIGN PATENT DOCUMENTS

JP    2003-217580 A    7/2003
JP    2008-149798 A    7/2008
(Continued)

*Primary Examiner* — Jonathan Jelsma
*Assistant Examiner* — Omar Kekia
(74) *Attorney, Agent, or Firm* — Volpe and Koenig, P.C.

(57) ABSTRACT

A lithium ion secondary battery includes a positive electrode capable of occluding and discharging lithium ions, a negative electrode capable of occluding and discharging the lithium ions, and a nonaqueous electrolyte including a lithium salt, and being reversively charged/discharged. The positive electrode includes a metal plate, a metal film formed on a surface of the metal plate, and a positive electrode active material layer, the metal film includes one or more metals selected from the group consisting of ruthenium, osmium, palladium, and platinum having a orientation, the positive electrode active material layer is a compound expressed by the following expression:

$LiCo_xNi_{1-x}O_2$, (where $0 \le x \le 1$)

and is epitaxially grown and formed on a surface of the metal film, and the positive electrode active material is formed such that a c axis of a crystal structure of the positive electrode active material is perpendicular to the metal film.

12 Claims, 13 Drawing Sheets

(51) Int. Cl.
  *H01M 4/525* (2010.01)
  *H01M 4/66* (2006.01)
  H01M 4/04 (2006.01)
  H01M 10/0525 (2010.01)

(52) U.S. Cl.
  CPC ........... *H01M 4/525* (2013.01); *H01M 4/661* (2013.01); *H01M 4/667* (2013.01); H01M 4/0426 (2013.01); H01M 4/0428 (2013.01); H01M 10/0525 (2013.01); *Y02E 60/122* (2013.01)

(58) Field of Classification Search
  CPC .... H01M 4/661; H01M 4/667; H01M 4/0421; H01M 10/0525; Y02E 60/122
  USPC ........................................................ 429/223
  See application file for complete search history.

(56) References Cited

U.S. PATENT DOCUMENTS

2012/0260478 A1* 10/2012 Kuriki ................. H01M 4/1391
  29/25.03
2012/0328942 A1* 12/2012 Thomas-Alyea ..... H01M 4/587
  429/211

FOREIGN PATENT DOCUMENTS

| | | |
|---|---|---|
| JP | 2009-224288 A | 10/2009 |
| JP | 2011/165605 A | 8/2011 |
| WO | 2011007412 A1 | 1/2011 |

\* cited by examiner

LITHIUM ION SECONDARY BATTERY

TECHNICAL FIELD

The present invention relates to a lithium ion secondary battery.

BACKGROUND ART

In recent years, lithium ion secondary batteries with high output and high energy density have drawn attention as a consumer electric device power source such as mobile phones. Further, application of such lithium ion secondary batteries to ships, railroads, automobiles, and the like, which can efficiently use the energy, has been desired.

Further, technologies to store power generated using natural energy such as wind power or sunlight in a lithium ion secondary battery, and to store power from a system have drawn attention for home use and for industrial use. Further, in a smart grid (next-generation transmission network) using an information technology (IT), a technology using a lithium ion secondary battery has drawn attention.

A lithium ion secondary battery is configured to include a positive electrode and a negative electrode that can occlude/discharge lithium ions and a separator in a container. The container is filled with a nonaqueous electrolyte including a lithium salt. Further, the positive electrode is configured to include a metal foil such as an aluminum foil and a positive electrode active material.

As the positive electrode active material, a lithium cobalt oxide ($LiCoO_2$) having a laminar rock salt structure, powder made of an oxide of lithium and a transition metal where a part or all of cobalt atoms of the lithium cobalt oxide is replaced with nickel, manganese, or the like is used, for example. The positive electrode active material is then fixed to the electrode plate by a binder (an adhesive).

As technologies related to electrodes of a lithium ion secondary battery, technologies disclosed in PTL 1 and PTL 2 are known.

CITATION LISTS

Patent Literatures

PTL 1: JP 2009-224288 A
PTL 2: Japanese Patent Application No. 2008-149798

SUMMARY OF INVENTION

Technical Problem

A crystal structure of the lithium cobalt oxide that is the positive electrode active material has a layered structure in which lithium layers (lithium ion layers) and cobalt layers ($CoO_2$ layers: cobalt dioxide layers) are alternately layered in a c-axis (a crystal axis in a height direction) direction. The lithium ions are discharged from between the cobalt layers into the nonaqueous electrolyte, or the lithium ions in the nonaqueous electrolyte are occluded between the cobalt layers, whereby charging/discharging is performed.

However, when a battery is repeatedly charged/discharged, spacing between the two cobalt layers in the c-axis direction may become narrow. As a result, a change of the crystal structure due to phase transition may be caused. This may cause characteristic deterioration of the lithium ion secondary battery using a lithium cobalt oxide. This change determines the life of the battery, and thus, measures against such characteristic deterioration have been desired.

Further, when the degree of adhesion (bonding strength) between the positive electrode active material and the electrode plate is low, interface peeling is caused between the positive electrode active material and the electrode plate when the battery is repeatedly charged/discharged, and the life of the battery may be decreased. Therefore, it is favorable to improve the degree of adhesion between the positive electrode active material and the electrode plate to prevent the peeling.

However, in the PTL 1 and PTL 2, no technologies to improve the characteristic deterioration of the battery (for example, a decrease in the life, and the like) have been disclosed at all. Therefore, according to the technologies described in PTL 1 and PTL 2, the battery characteristics may be deteriorated, and the life of the battery may become short.

In view of foregoing, the present invention has been made. That is, an objective of the present invention is to provide a long-life lithium ion secondary battery.

Solution to Problem

The inventors performed diligent examination in order to solve the problems, and as a result, they have found out that the problems can be solved by providing a metal film including a specific metal between an electrode plate and a positive electrode active material, and have completed the present invention.

Advantageous Effects of Invention

According to the present invention, a long-life lithium ion secondary battery can be provided.

DESCRIPTION OF EMBODIMENTS

Hereinafter, embodiments for implementing the present invention (the present embodiment) will be described with reference to the drawings. Note that an orientation plane of a lithium cobalt oxide or each metal in the following description is an orientation plane in a metal crystal, unless otherwise specified. Therefore, for example, a "(001) plane of a lithium cobalt oxide" indicates a (001) plane of a lithium cobalt oxide crystal.

1. First Embodiment

Figure 1:
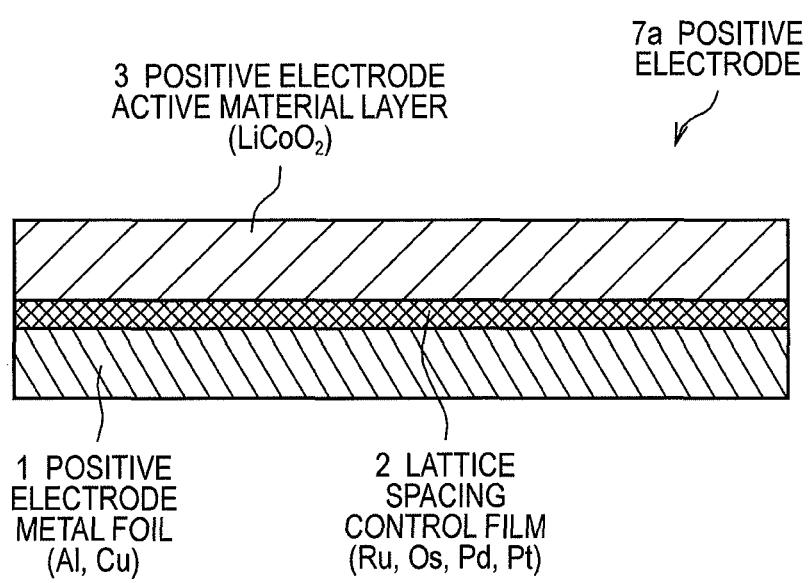
FIG. 1 is a schematic cross sectional view of a positive electrode according to First Embodiment.

A positive electrode applied to a lithium ion secondary battery has a structure capable of occluding/discharging lithium ions in a nonaqueous electrolyte. To be specific, as illustrated in FIG. 1, a positive electrode 7a applied to a lithium ion secondary battery according to the present embodiment is configured from a positive electrode metal foil 1, a lattice spacing control film 2 layered on a surface of the positive electrode metal foil 1, and a positive electrode active material layer 3 layered on the lattice spacing control film 2 on a side opposite to the positive electrode metal foil 1.

The positive electrode metal foil 1 is an electrode plate (that is, a positive electrode plate) used as a positive electrode. The positive electrode metal foil 1 is made of a conductive metal such as aluminum (Al) or copper (Cu). The positive electrode metal foil 1 has a foil-like shape, and an electrode plate material usually used for a battery such as a lithium ion secondary battery may just be appropriately used.

The lattice spacing control film 2 includes ruthenium (Ru), osmium (Os), palladium (Pd), or platinum (Pt). Two or more types of these metals may be used together by an arbitrary combination and proportion. The positive electrode 7a includes such lattice spacing control film 2, whereby the positive electrode active material layer 3 can be more firmly fixed to the positive electrode metal foil 1.

The metals that configure the lattice spacing control film 2 have a (111) orientation. Examples of a method of forming the lattice spacing control film 2 on a surface of the positive electrode metal foil 1 with the orientation include a vacuum deposition method, a sputtering method, and a chemical vapor deposition (CVD) method.

The lattice spacing control film 2 may include metals other than the above-described metals and other materials within a range not to significantly impair effects of the present invention. Note that, for ease of description, the lattice spacing control film 2 does not include other metals and materials in the following description.

The positive electrode active material layer 3 is layered on a surface of the lattice spacing control film 2. The positive electrode active material layer 3 of the positive electrode 7a includes a lithium cobalt oxide ($LiCoO_2$) as the positive electrode active material. Note that, as the positive electrode active material applicable to the present embodiment, a compound obtained by replacing a part of cobalt with nickel is also favorably applicable in view of similarity in the atomic structures between cobalt and nickel (to be specific, the lattice constants are almost the same). That is, as the positive electrode active material applicable to the positive electrode active material layer 3, compounds expressed by the following expression (1):

$$LiCo_xNi_{1-x}O_2 \text{(where } 0 \leq x \leq 1\text{)} \quad (1)$$

Note that, among the compounds expressed by the expression (1), a compound of x=1, that is, a lithium cobalt oxide is favorable in view of the fact that the compound is commonly used and can be easily obtained. Therefore, in the present embodiment, description will be given using a lithium cobalt oxide as the positive electrode active material.

Further, the positive electrode active material layer 3 may appropriately include a positive electrode active material other than the positive electrode active material of the expression (1) or a material other than the positive electrode active materials. However, hereinafter, the present embodiment will be described, in which the positive electrode active material layer 3 only includes a lithium cobalt oxide, for ease of description.

In the present embodiment, the positive electrode active material layer 3 is formed such that a lithium cobalt oxide is epitaxially grown on a surface of the lattice spacing control film 2. A method of forming the positive electrode active material layer 3 is not especially limited. For example, as the forming method, a sputtering method, a chemical vapor deposition (CVD) method, a laser activation method, or the like can be used.

Figure 2:
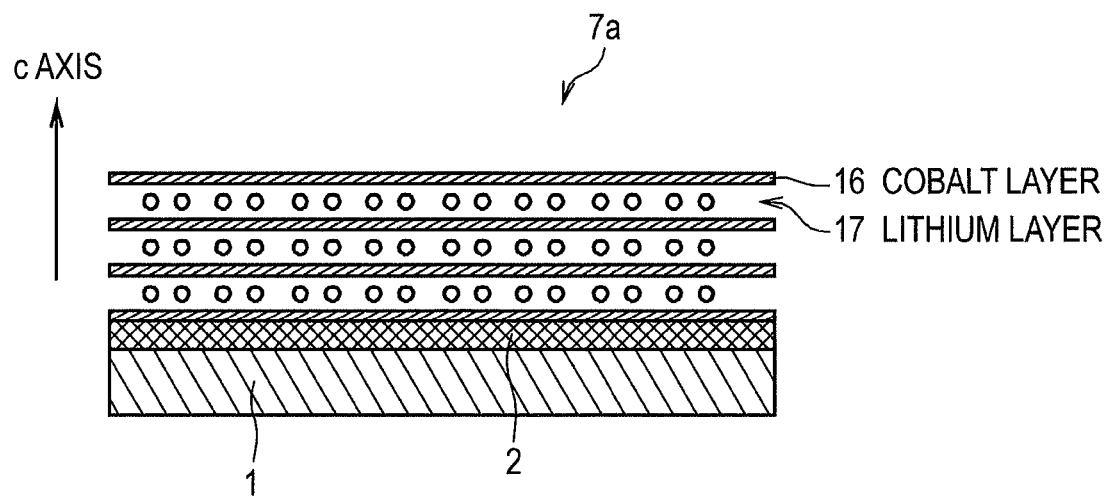
FIG. 2 is a schematic cross sectional view of a molecular structure of a positive electrode active material layer of the positive electrode according to First Embodiment.

As illustrated in FIG. 2, in the present embodiment, the positive electrode active material layer 3 is formed such that a c-axis of a crystal structure that configures the positive electrode active material layer 3 is perpendicular to the surface to the lattice spacing control film 2. That is, the (001) plane of the lithium cobalt oxide (densest crystal surface) is parallel with the surface of the positive electrode metal foil 1. These structures can be confirmed by an X-ray crystal structure analysis or an electron microscope.

Further, the positive electrode active material layer 3 is configured such that cobalt layers (cobalt oxide ($CoO_2^-$) layers) 16 and lithium layers ($Li^+$) 17 are alternately layered. The cobalt layers 16 and the lithium layers 17 are formed to be parallel with the positive electrode metal foil 1. When the lithium ion secondary battery that uses the positive electrode 7a is charged/discharged, the lithium ions that configure the lithium layer 17 between the two adjacent cobalt layers are discharged/occluded into/from an outside (hereinafter, this phenomena is referred to as "occluding/discharging of lithium ions"). In this way, the lithium ions are exchanged between the positive electrode 7a and the nonaqueous electrolyte.

According to the examination by the inventors of the present invention, when the occluding/discharging of the lithium ions is repeated many times (that is, when a charging/discharging cycle is increased), the spacing between the two adjacent cobalt layers 16 (the spacing in the up and down direction on the paper surface of FIG. 2) becomes usually narrower. When the spacing becomes narrower, movement of the nonaqueous electrolyte of the lithium ions cannot be easily performed. Therefore, with an increase in the charging/discharging cycle, the occluding/discharging of the lithium ions cannot be easily performed, and the battery capacity of the lithium ion secondary battery is decreased.

In addition, the spacing between the two adjacent cobalt layers 16 becomes narrower, and an interatomic distance between close atoms becomes shorter. Therefore, close atoms can be easily coupled. As a result, the crystal structure of the lithium cobalt oxide can be easily changed. Then, when phase transition is caused and the crystal structure of the lithium cobalt oxide is changed, the performance of the battery is deteriorated. Further, the lithium cobalt oxide (positive electrode active material layer 3) can be easily peeled from the positive electrode 7a.

In view of the foregoing, the present invention has been made. To be specific, as illustrated in FIGS. 1 and 2, the lattice spacing control film 2 is provided between the positive electrode metal foil 1 and the positive electrode active material layer 3. This can enlarge the spacing between the two adjacent cobalt layers 16. Therefore, going in and out (occluding/discharging) of the lithium ions can be easily performed, and the capacity of the battery can be increased. Moreover, even if the going in and out of the lithium ions is repeated and the layer spacing becomes narrower, sufficient spacing is still obtained. Therefore, the crystal structure of the lithium cobalt oxide is not easily changed, and a favorable cycle characteristic is shown.

Hereinafter, four metals (Ru, Os, Pd, and Pt) that can be included in the lattice spacing control film 2 will be described with reference to FIGS. 3 to 6.

As described above, the lithium cobalt oxide as the positive electrode active material included in the positive electrode active material layer 3 is epitaxially grown to form the positive electrode active material layer 3. Therefore, the lithium cobalt oxide needs to be epitaxially grown on the metal that configures the lattice spacing control film 2. Therefore, it is important to use a metal close to the closest interatomic distance of the lithium cobalt oxide as the metal that configures the lattice spacing control film 2. To be specific, examples of such a metal include nickel (Ni), cobalt (Co), copper (Cu), palladium (Pd), osmium (Os), ruthenium (Ru), iridium Ir), aluminum (Al), silver (Ag), tantalum (Ta), hafnium (Hf), zirconium (Zr), vanadium (V), platinum (Pt), and gold (Au). Hereinafter, these metals exemplarily described here are called "candidate metals 1".

Note that the candidate metals 1 are metals in which an absolute value of lattice mismatch is 13% or less. In the present specification, the "lattice mismatch" is a value obtained by dividing "the closest interatomic distance in an object metal" by "the closest interatomic distance in a lithium cobalt oxide". Note that, when the lattice spacing of the candidate metal 1 and the lattice spacing of the lithium cobalt oxide are too different (that is, the lattice mismatch is too large), the lithium cobalt oxide may not be able to be epitaxially grown. Further, when the lattice mismatch is too large, the lithium cobalt oxide may become amorphous.

The lattice mismatch of the candidate metal 1 with respect to the lithium cobalt oxide is 13% or less, which is small. Therefore, the lithium cobalt oxide can be epitaxially grown on the surface of the lattice spacing control film 2. Then, when the (001) plane of the lithium cobalt oxide and the (111) plane of the candidate metal 1 are connected, the mismatch of the closest interatomic distance becomes smallest. At this time, the epitaxial growth of the lithium cobalt oxide is facilitated.

However, there is a problem in the bonding strength if the lithium cobalt oxide is easily peeled, even if the lithium cobalt oxide is simply epitaxially grown. Therefore, the bonding strength between the candidate metal 1 (lattice spacing control film 2) and the lithium cobalt oxide (positive electrode active material layer 3) was evaluated using molecular dynamics software (Forcite incorporated in Materials Studio made by Accelrys K.K.). To be specific, the interface peel strengths between the (001) plane of the lithium cobalt oxide and the (111) plane of the candidate metal 1 was evaluated.

Figure 3:
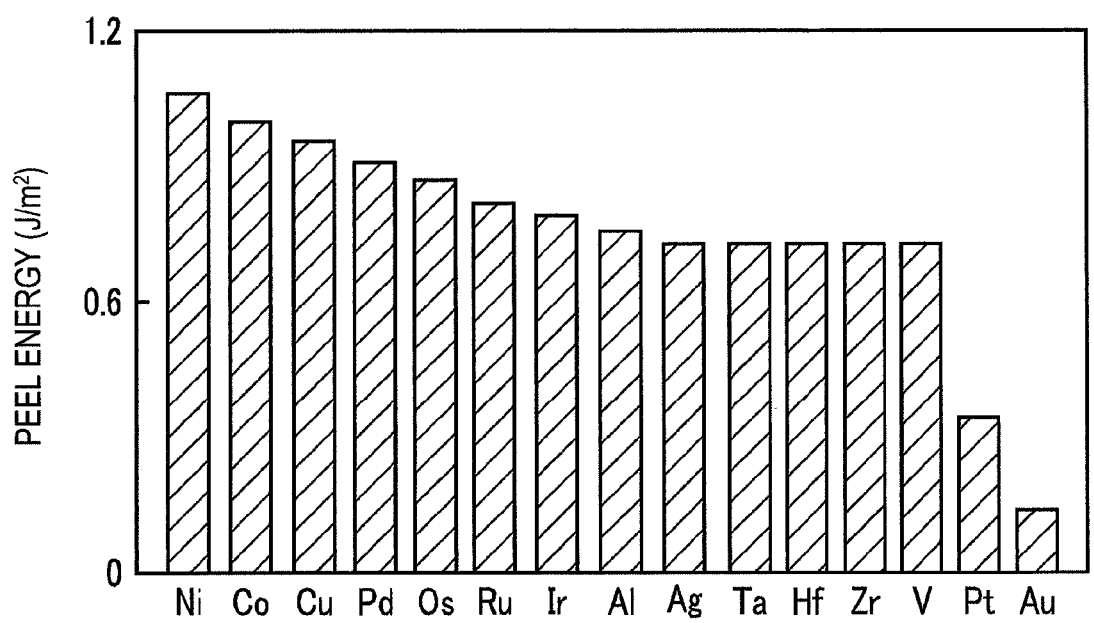
FIG. 3 is a graph of peel energy in each metal.

A result thereof is illustrated in FIG. 3. FIG. 3 indicates the larger the peel energy, the larger the peel strength, and the lithium cobalt oxide cannot be easily peeled. As illustrated in FIG. 3, when gold (Au) was used as the metal that configures the lattice spacing control film 2, the peel energy was significantly smaller than other metals. Therefore, it has been found that the interface peeling is easily caused. Further, when Ni, Co, Cu, Pd, Os, Ru, Ir, Al, Ag, Ta, Hf, Zr, or V was used, an especially high peel energy was shown. Therefore, it has been found that, when these metals (Ni, Co, Cu, Pd, Os, Ru, Ir, Al, Ag, Ta, Hf, Zr, or V) is applied to the lattice spacing control film 2, the positive electrode active material layer 3 is particularly not able to be easily peeled.

Note that iridium (Ir) sometimes has a catalyst activity. Therefore, when iridium is intended to be applied to the lattice spacing control film 2, impurities may be attached to the lithium cobalt oxide in a manufacturing process of the positive electrode 7a. When the impurities are attached, the performance as the positive electrode may be decreased. Therefore, iridium was excluded from the metals applicable to the lattice spacing control film 2.

Next, stability of the lithium cobalt oxide of when the lithium cobalt oxide (positive electrode active material layer 3) is epitaxially grown on the (111) plane (lattice spacing control film 2) of Ni, Co, Cu, Pd, Os, Ru, Al, Ag, Ta, Hf, Zr, or V was evaluated. To be specific, an atom diffusion coefficient of when the lithium cobalt oxide is epitaxially grown on the (111) plane of the candidate metal 1 was evaluated using the molecular dynamics software.

Figure 4:
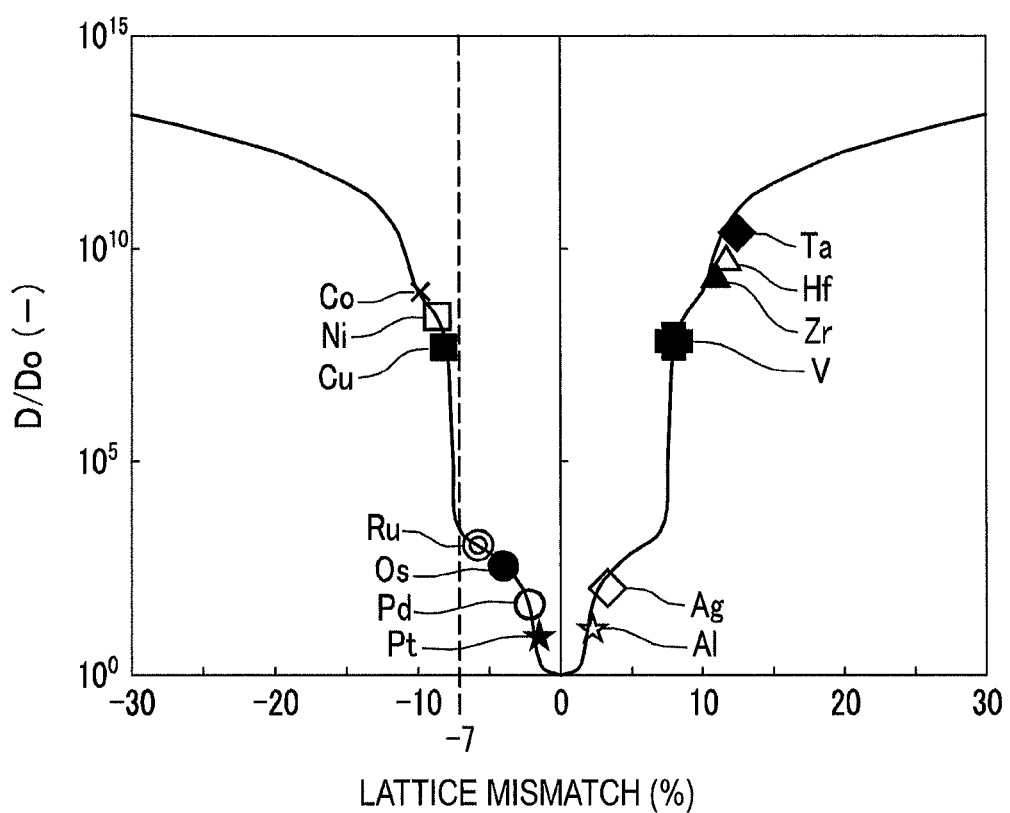
FIG. 4 is a graph of a diffusion coefficient ratio with respect to lattice mismatch.

An obtained result is FIG. 4. In the graph illustrated in FIG. 4, the horizontal axis represents the lattice mismatch between the (001) plane of the lithium cobalt oxide and the (111) plane of the candidate metal 1, and the vertical axis represents a relative ratio ($D/D_0$) of the atom diffusion coefficient regarding the lithium cobalt oxide. Note that "D" is an atom diffusion coefficient of when the lattice spacing control film in which the lattice mismatch exists is used, and "$D_0$" is a diffusion coefficient of when the lattice spacing control film in which no lattice mismatch exists is used.

As illustrated in FIG. 4, the larger the absolute value of the lattice mismatch, the larger the relative ratio ($D/D_0$). This indicates the stability of the crystal is reduced as the lattice mismatch is larger. Especially, it has been found that, when the absolute value of the lattice mismatch is 7% or more, the relative ratio is sharply increased, and the crystal becomes amorphous. Further, when Co, Ni, Cu, V, Zr, Hf, or Ta among the candidate metals 1 is applied to the lattice spacing control film 2, the lithium cobalt oxide becomes unstable, and an effect to sufficiently enlarge a crystal lattice of the lithium cobalt oxide in the c-axis direction cannot be obtained.

Meanwhile, it has been found that, when Ru, Os, Pd, Pt, Al, or Ag in which the absolute value of the lattice mismatch is 7% or less is applied, the lithium cobalt oxide was stable.

Figure 5:
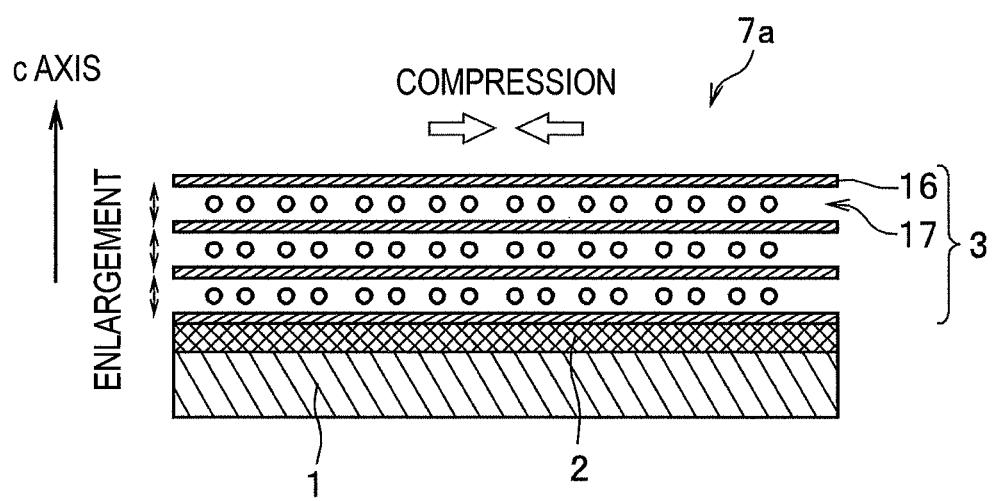
FIG. 5 is a diagram describing a change of lattice spacing in the positive electrode active material layer in the positive electrode according to a first embodiment.

When the c axis of the lithium cobalt oxide is epitaxially grown to be perpendicular to the positive electrode metal foil 1, the cobalt layer 16 and the lithium layer 17 become parallel with the positive electrode metal foil 1. In this case, as illustrated in FIG. 5, to enlarge the lattice spacing in the c-axis direction, it is necessary to make the lattice spacing (closest interlattice distance) in the (001) plane of the lithium cobalt oxide short. In other words, it is necessary to compress the cobalt layer 16 illustrated in FIG. 5 in the horizontal direction of the paper surface. By the compression, the spacing in the c-axis direction is enlarged by a Poisson's ratio. Therefore, a metal in which the lattice mismatch in FIG. 4 is negative is applied to the lattice spacing control film 2, whereby the lattice spacing in the c-axis direction can be enlarged. Therefore, among the metals, metals having such an effect to enlarge the lattice spacing in the c-axis direction are Ru, Os, Pd, and Pt.

Next, an expansion of a lattice of a lithium cobalt oxide in the c-axis direction (an enlargement ratio) of when the lithium cobalt oxide is epitaxially grown on a (111) plane of each metal of Ni, Co, Cu, Pd, Os, Ru, Al, Ag, Ta, Hf, Zr, V, and Pt which are the candidate metals 1 was evaluated. The evaluation was performed similarly to the interface peel strength. A result thereof is illustrated in FIG. 6.

Figure 6:
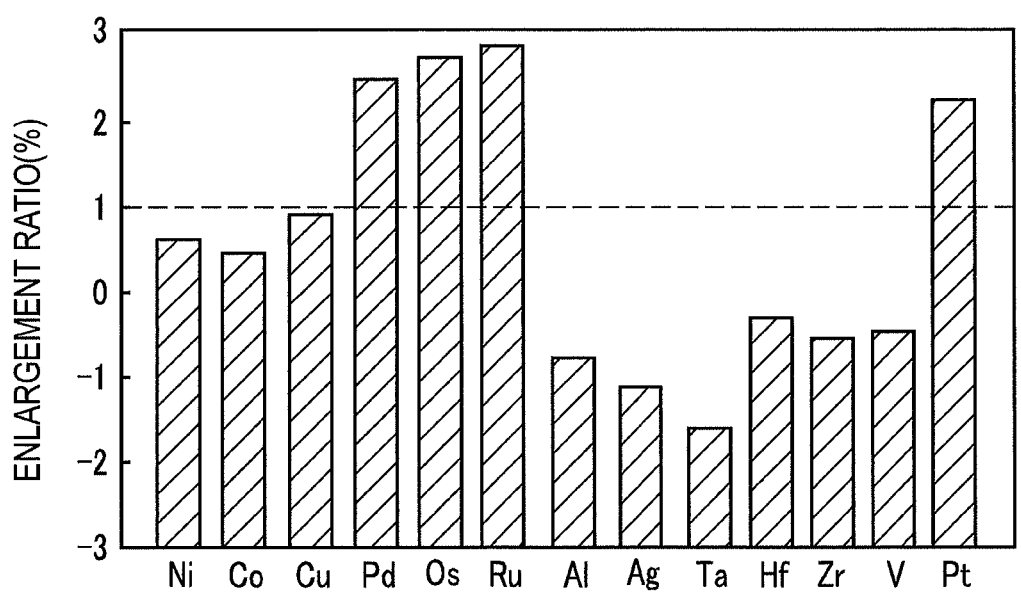
FIG. 6 is a graph of an enlargement ratio of lattice spacing in each metal.

As illustrated in FIG. 6, it has been found that, when Pd, Os, Ru, or Pt was applied to the lattice spacing control film 2, the lattice spacing can be enlarged by 1% or more, compared with a case in which the lattice spacing is not controlled. Especially, these metals included an enlargement ratio of 2% or more. Meanwhile, when Al or Ag was applied, the enlargement ratio was a negative value. That is, it has been found that, when Al or Ag was applied, the lattice spacing in the c-axis direction becomes shorter. Therefore, to increase the lattice spacing in the c-axis direction, it is favorable to use Pd, Os, Ru, or Pt.

According to the above results, it has been found that the lattice spacing control film 2 configured from Pd, Os, Ru, or Pt having the (111) orientation is formed on the positive electrode metal foil 1, and the positive electrode active material layer 3 may just be formed thereon by the epitaxial growth in order to prevent peeling of the positive electrode active material from the electrode 7 and to enlarge the lattice spacing in the c-axis direction. Further, this enables the positive electrode active material layer 3 to be stably formed on the lattice spacing control film 2.

The lattice spacing of the positive electrode active material in the c-axis direction in the positive electrode active material layer 3 has a crystal structure enlarged more than usual, whereby the lattice spacing in the c-axis direction can be suppressed to become extremely short, even if the lithium ions are discharged into an outside at the time of charging/discharging. Therefore, deterioration of the structure of the positive electrode active material due to shortening of the lattice spacing can be prevented. Accordingly, a long-life lithium ion secondary battery excellent in the cycle characteristic can be provided.

Further, the lattice spacing control film 2 having a high peel strength is provided between the positive electrode metal foil 1 and the positive electrode active material layer 3, whereby the positive electrode active material layer 3 can be prevented from peeling from the electrode 7a, even if the battery is repeatedly charged/discharged. Accordingly, a long-life lithium ion secondary battery excellent in the cycle characteristic can be provided.

Further, the lithium ions can be more easily moved (occluded/discharged) by enlargement of the lattice spacing in the c axis. Therefore, the capacity of the battery can be increased.

2. Second Embodiment

Next, a positive electrode according to Second Embodiment will be described with reference to FIGS. 7 to 12. A positive electrode (positive electrode 7b) according to Second Embodiment is basically similar to the positive electrode (positive electrode 7a) according to First Embodiment. Here, points different from the positive electrode according to First Embodiment will be mainly described in the following description, and detailed description of similar points is omitted. Further, members similar to First Embodiment are denoted with similar reference signs and names, and detailed description thereof is omitted.

Figure 7:
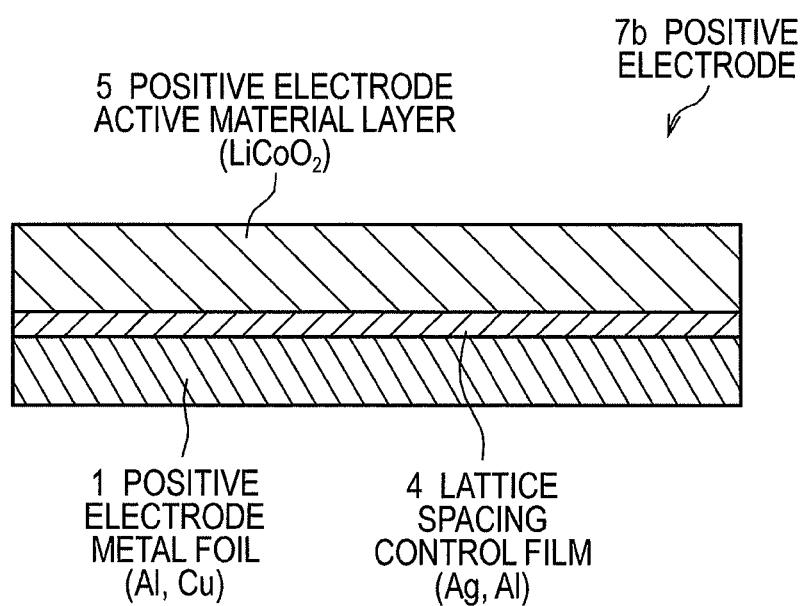
FIG. 7 is a schematic cross sectional view of a positive electrode according to a second embodiment.

In the positive electrode 7b illustrated in FIG. 7, a lattice spacing control film 4 and a positive electrode active material layer 5 are layered on a surface of a positive electrode metal foil 1 in this order.

The lattice spacing control film 4 includes silver (Ag) and/or aluminum (Al). The metals included in the lattice spacing control film 4 has a (110) orientation. To form the lattice spacing control film 4 including Ag and/or Al having such an orientation, an object metal is rolled on the surface of the positive electrode metal foil 1, for example, whereby the lattice spacing control film 4 having the (110) orientation can be formed.

The lattice spacing control film 4 may include metals other than the above-described metals and other materials within a range not to significantly impair effects of the present invention, similarly to the lattice spacing control film 2 described above. Note that, in the following description, the lattice spacing control film 4 does not include other metals and materials for ease of description.

Further, the positive electrode active material layer 5 includes compounds expressed by the expression (2) below as the positive electrode active material:

$$LiCo_yNi_{1-y}O_2 (\text{where } 0 \le y \le 1) \quad (2)$$

The compounds expressed by the expression (2) are similar to the compounds expressed by the expression (1), and thus detailed description thereof is omitted. Further, in the following description, y=1 is favorable, similarly to the expression (1), and thus description will be given by exemplarily using a lithium cobalt oxide (that is, y=1 in the expression (2)) as the positive electrode active material.

Further, the positive electrode active material layer 5 may appropriately include a positive electrode active material other than the positive electrode active material of the expression (2) or a material other than the positive electrode active materials. However, hereinafter, the present embodiment will be described, in which the positive electrode active material layer 5 only includes a lithium cobalt oxide, for ease of description.

Figure 8:
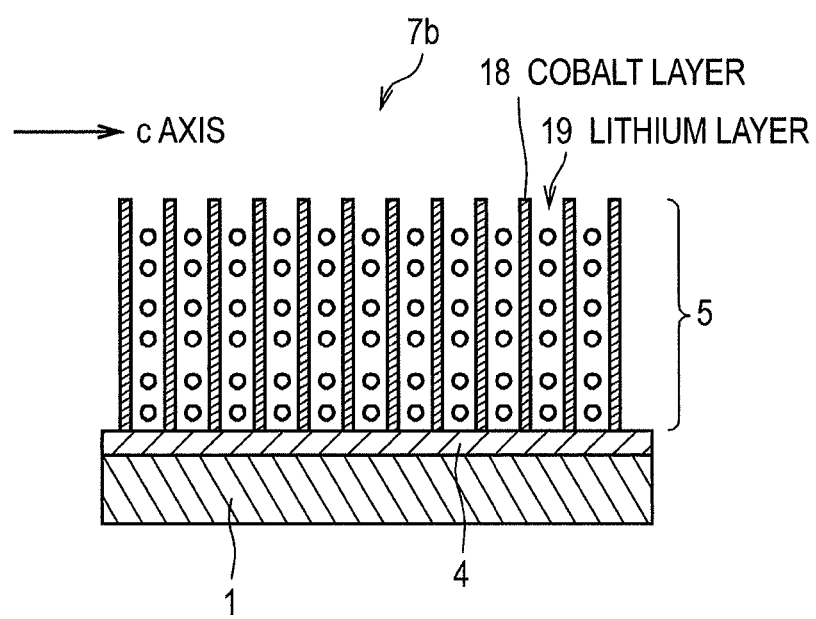
FIG. 8 is a schematic cross sectional view of a molecular structure of the positive electrode active material layer of the positive electrode according to the second embodiment.

A structure of the positive electrode active material layer 5 in the positive electrode 7b is illustrated in FIG. 8. The positive electrode active material layer 5 is epitaxially grown on the lattice spacing control film 4, similarly to the positive electrode active material layer 3 described above. As illustrated in FIG. 8, a c axis of a lithium cobalt oxide that configures the positive electrode active material layer 5 is parallel with (that is, horizontal with) the surface of the lattice spacing control film 4.

Further, the positive electrode active material layer 5 is made of cobalt layers 18 and lithium layers 19. Further, the cobalt layers 18 and the lithium layers 19 are perpendicular to the positive electrode metal foil 1 and the lattice spacing control film 4. That is, the (001) plane (second dense crystal surface) of the lithium cobalt oxide is perpendicular to the positive electrode metal foil 1. Going in and out of the lithium ions between the two cobalt layers 18 enables charging/discharging of the battery.

Note that the positive electrode active material layer 5 can be formed similarly to the positive electrode active material layer 3. That is, the lattice spacing control film 4 in which the orientation has been controlled (to be specific, having the (110) orientation) is formed. Therefore, the positive electrode active material layer 5 is formed on the lattice spacing control film 4 in a stable state (in the (110) orientation illustrated in FIG. 8).

Similarly to First Embodiment, according to the examination by the inventors of the present invention, it has been found that a battery excellent in battery characteristics can be provided by enlargement of the distance between two adjacent cobalt layers 18. That is, while, in First Embodiment, a case in which the distance is enlarged when the c axis of the lithium cobalt oxide is perpendicular to the positive electrode metal foil 1 has been described, in Second Embodiment, a case where the distance is enlarged when the c axis is parallel with the positive electrode metal foil 1 will be described.

Hereinafter, two metals that can be included in the lattice spacing control film 4 will be described with reference to FIGS. 9 to 12.

First, it is important that a lithium cobalt oxide that is the positive electrode active material is epitaxially grown on the lattice spacing control film 4 made of the metals having the (110) orientation. Therefore, it is important that the closest interatomic distance of the metals that configure the lattice spacing control film is close to the closest interatomic distance in the lithium cobalt oxide. In view of the foregoing, examples of the metals included in the lattice spacing control film 4 include, for example, nickel (Ni), cobalt (Co), copper (Cu), palladium (Pd), osmium (Os), ruthenium (Ru), iridium (Ir), aluminum (Al), silver (Ag), tantalum (Ta), hafnium (Hf), zirconium (Zr), vanadium (V), platinum (Pt), and gold (Au). Hereinafter, these metals are called "candidate metals 2".

Lattice mismatch of the candidate metals 2 with respect to a lithium cobalt oxide is 13% or less, which is small. Therefore, the lithium cobalt oxide can be epitaxially grown on the surface of the lattice spacing control film 4. When the (110) plane of the lithium cobalt oxide and the (110) plane of the candidate metal 2 are connected, the mismatch of the closest interatomic distance is minimized. At this time, the epitaxial growth of the lithium cobalt oxide is facilitated.

However, there is a problem in the bonding strength if the lithium cobalt oxide is easily peeled, even if the lithium cobalt oxide is simply epitaxially grown. Therefore, similarly to First Embodiment, the bonding strength between the candidate metal 2 (lattice spacing control film 4) and the lithium cobalt oxide (positive electrode active material layer 5) was evaluated. To be specific, the interface peel strength between the (110) plane of the lithium cobalt oxide and the (110) plane of the candidate metal 2 was evaluated.

Figure 9:
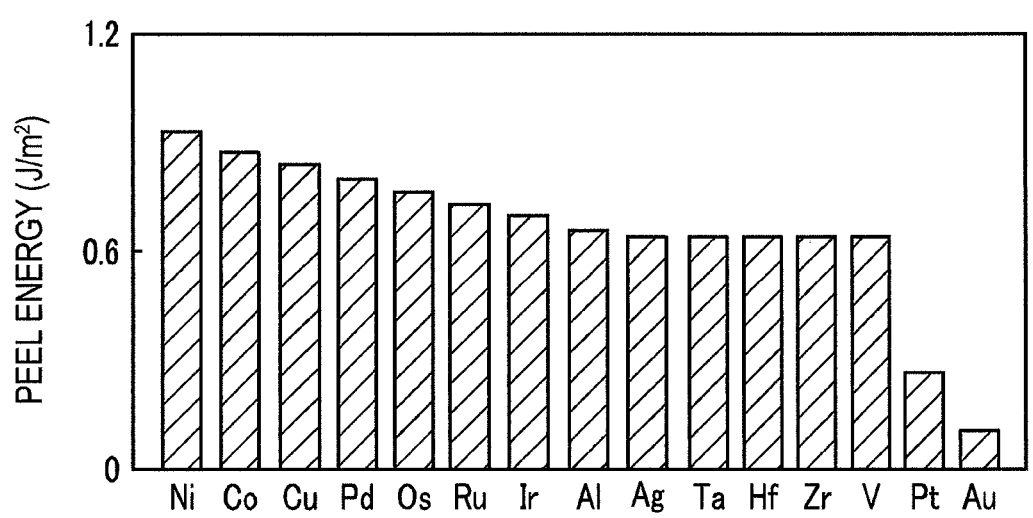
FIG. 9 is a graph illustrating peel energy in each metal.

A result thereof is illustrated in FIG. 9. FIG. 9 indicates the larger the peel energy, the larger the peel strength, and the lithium cobalt oxide cannot be easily peeled. As illustrated in FIG. 9, when gold (Au) was used as the metal that configures the lattice spacing control film 4, the peel energy was significantly smaller than other metals. Therefore, it has been found that the interface peeling is easily caused. Further, when Ni, Co, Cu, Pd, Os, Ru, Ir, Al, Ag, Ta, Hf, Zr, or V was used, an especially high peel energy was shown. Therefore, it has been found that, when these metals (Ni, Co, Cu, Pd, Os, Ru, Ir, Al, Ag, Ta, Hf, Zr, or V) is applied to the lattice spacing control film 4, the positive electrode active material layer 5 is particularly not able to be easily peeled.

Note that iridium (Ir) sometimes has a catalyst activity. Therefore, when iridium is intended to be applied to the lattice spacing control film 4, impurities may be attached to the lithium cobalt oxide in a manufacturing process of the positive electrode 7b. When such impurities are attached, the performance as the positive electrode may be decreased. Therefore, iridium was excluded from the metals applicable to the lattice spacing control film 4.

Next, stability of a lithium cobalt oxide of when the lithium cobalt oxide (positive electrode active material layer 5) is epitaxially grown on the (110) plane (lattice spacing control film 4) of Ni, Co, Cu, Pd, Os, Ru, Al, Ag, Ta, Hf, Zr, or V was evaluated. To be specific, the atom diffusion coefficient of when the lithium cobalt oxide is epitaxially grown on the (110) plane of the candidate metal 2 was evaluated using the above-described molecular dynamics software.

Figure 10:
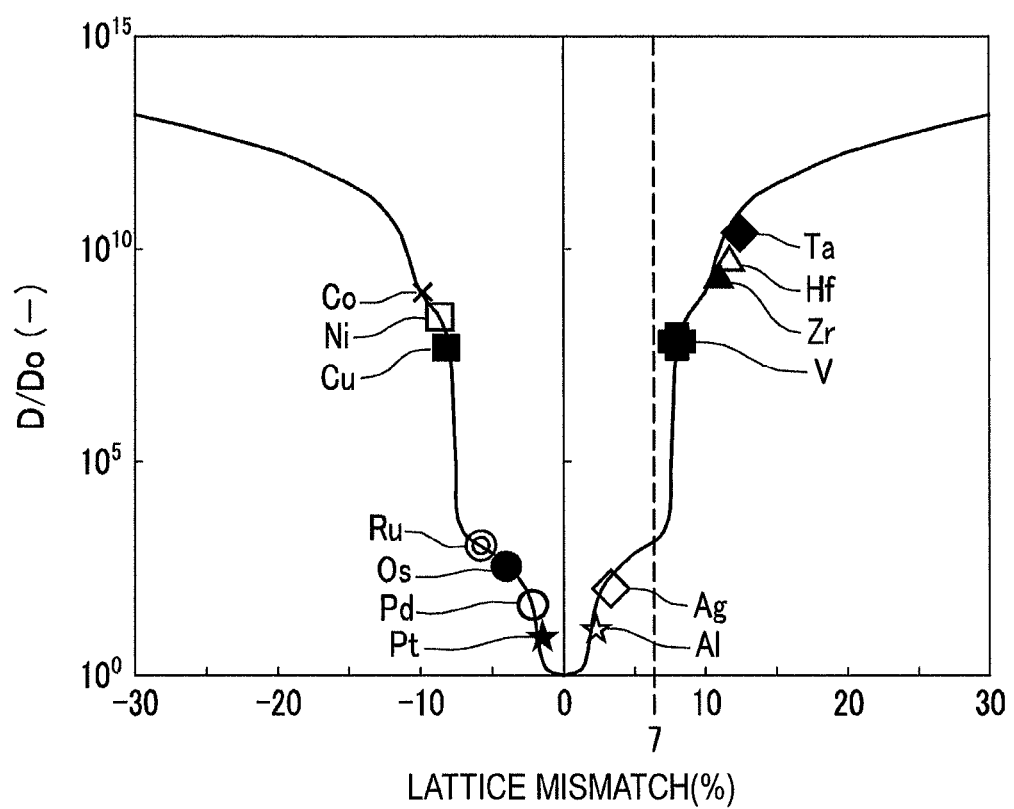
FIG. 10 is a graph of a diffusion coefficient ratio with respect to lattice mismatch.

An obtained result is FIG. 10. In a graph illustrated in FIG. 10, the horizontal axis represents the lattice mismatch between the (110) plane of the lithium cobalt oxide and the (110) plane of the candidate metal 2, and the vertical axis represents the relative ratio ($D/D_0$) of the atom diffusion coefficient regarding the lithium cobalt oxide. Note that "D" is an atom diffusion coefficient of when the lattice spacing control film in which the lattice mismatch exists is used, and "$D_0$" is a diffusion coefficient of when the lattice spacing control film in which no lattice mismatch exists is used.

As illustrated in FIG. 10, the larger the absolute value of the lattice mismatch, the larger the relative ratio ($D/D_0$). This indicates the stability of the crystal is reduced as the lattice mismatch is larger. Especially, it has been found that, when the absolute value of the lattice mismatch is 7% or more, the relative ratio is sharply increased, and the crystal becomes amorphous. Further, when Co, Ni, Cu, V, Zr, Hf, or Ta among the candidate metals 2 is applied to the lattice spacing control film 4, the lithium cobalt oxide becomes unstable, and the effect to enlarge the crystal lattice of the lithium cobalt oxide in the c-axis direction cannot be sufficiently obtained.

Meanwhile, it has been found that, when Ru, Os, Pd, Pt, Al, or Ag in which the absolute value of the lattice mismatch is 7% or less is applied, the lithium cobalt oxide is stable.

Figure 11:
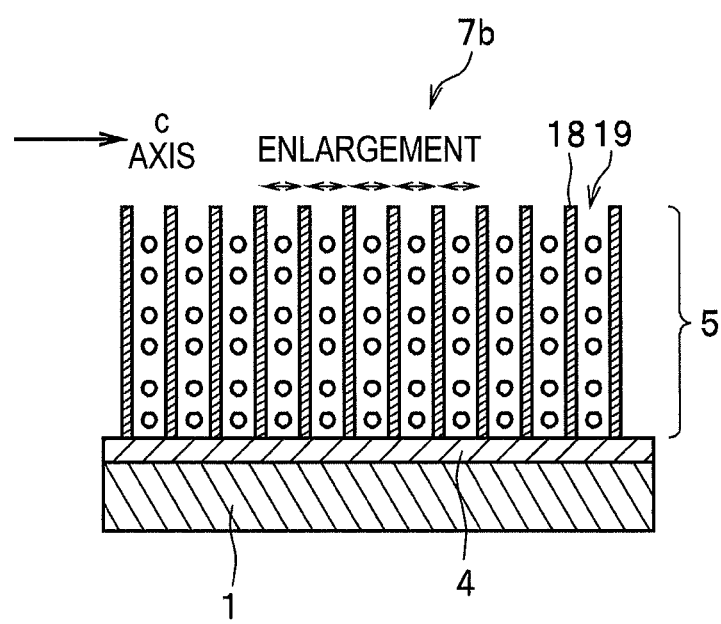
FIG. 11 is a diagram describing a change of lattice spacing in the positive electrode active material layer in the positive electrode according to the second embodiment.

When the c axis of the lithium cobalt oxide is epitaxially grown to be parallel with the positive electrode metal foil 1, the cobalt layer 18 and the lithium layer 19 are perpendicular to the positive electrode metal foil 1. Then, to enlarge the lattice spacing in the c-axis direction in this case, it is necessary to make the lattice spacing (closest interlattice distance) of the (110) plane of the lithium cobalt oxide long, as illustrated in FIG. 11. In other words, a metal in which the lattice mismatch in FIG. 10 becomes plus is applied to the lattice spacing control film 4, whereby the lattice spacing in the c-axis direction can be enlarged. Therefore, among the metals, metals having such an effect to enlarge the lattice spacing in the c-axis direction are Al and Ag.

Next, an expansion of a lattice of the lithium cobalt oxide in the c-axis direction (enlargement ratio) of when the lithium cobalt oxide is epitaxially grown on a (110) plane of each metal of Ni, Co, Cu, Pd, Os, Ru, Al, Ag, Ta, Hf, Zr, V, and Pt, which are the candidate metals 2, was evaluated. The evaluation was performed similarly to First Embodiment. A result thereof is illustrated in FIG. 12.

Figure 12:
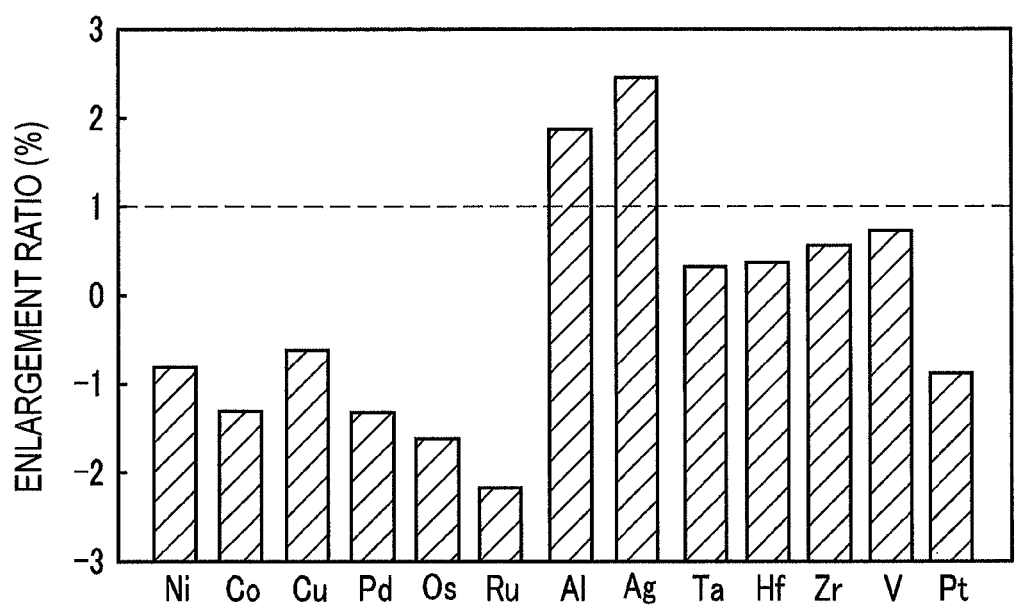
FIG. 12 is a graph of an enlargement ratio of lattice spacing in each metal.

As illustrated in FIG. 12, it has been found that the lattice spacing can be enlarged by 1% or more when Al or Ag is applied to the lattice spacing control film 4, compared with a case in which the lattice spacing is not controlled. Especially, Ag has an enlargement ratio of 2% or more. Meanwhile, when Pd, Os, Ru, or Pt is applied, the enlargement ratio was a negative value. That is, it has been found that, when Pd, Os, Ru, or Pt is applied, the lattice spacing in the c-axis direction becomes shorter. Therefore, it has been found that it is favorable to use Al or Ag in order to increase the lattice spacing in the c-axis direction.

According to the result, it has been found that the lattice spacing control film 4 configured from Al or Ag and having the (110) orientation may just be formed on the positive electrode metal foil 1, and the positive electrode active material layer 5 is formed thereon by the epitaxial growth in order to prevent the positive electrode active material from peeling from the electrode 7 and to enlarge the lattice spacing in the c-axis direction. Further, this enables the positive electrode active material layer 5 to be stably formed on the lattice spacing control film 4.

The lattice spacing of the positive electrode active material in the c-axis direction in the positive electrode active material layer 5 has a crystal structure enlarged more than usual, whereby the lattice spacing in the c-axis direction can be suppressed to become extremely short, even if the lithium ions are discharged into an outside at the time of charging/discharging. Therefore, deterioration of the structure of the positive electrode active material due to shortening of the lattice spacing can be prevented. Accordingly, a long-life lithium ion secondary battery excellent in the cycle characteristic can be provided.

Further, the lattice spacing control film 4 having a high peel strength is provided between the positive electrode metal foil 1 and the positive electrode active material layer 5, whereby the positive electrode active material layer 4 can be prevented from peeling from the electrode 7b, even if the battery is repeatedly charged/discharged. Accordingly, a long-life lithium ion secondary battery excellent in the cycle characteristic can be provided.

Further, the lithium ions can be easily moved by enlargement of the lattice spacing in the c axis. Therefore, the capacity of the battery can be increased.

3. Lithium Ion Secondary Battery

Figure 13:
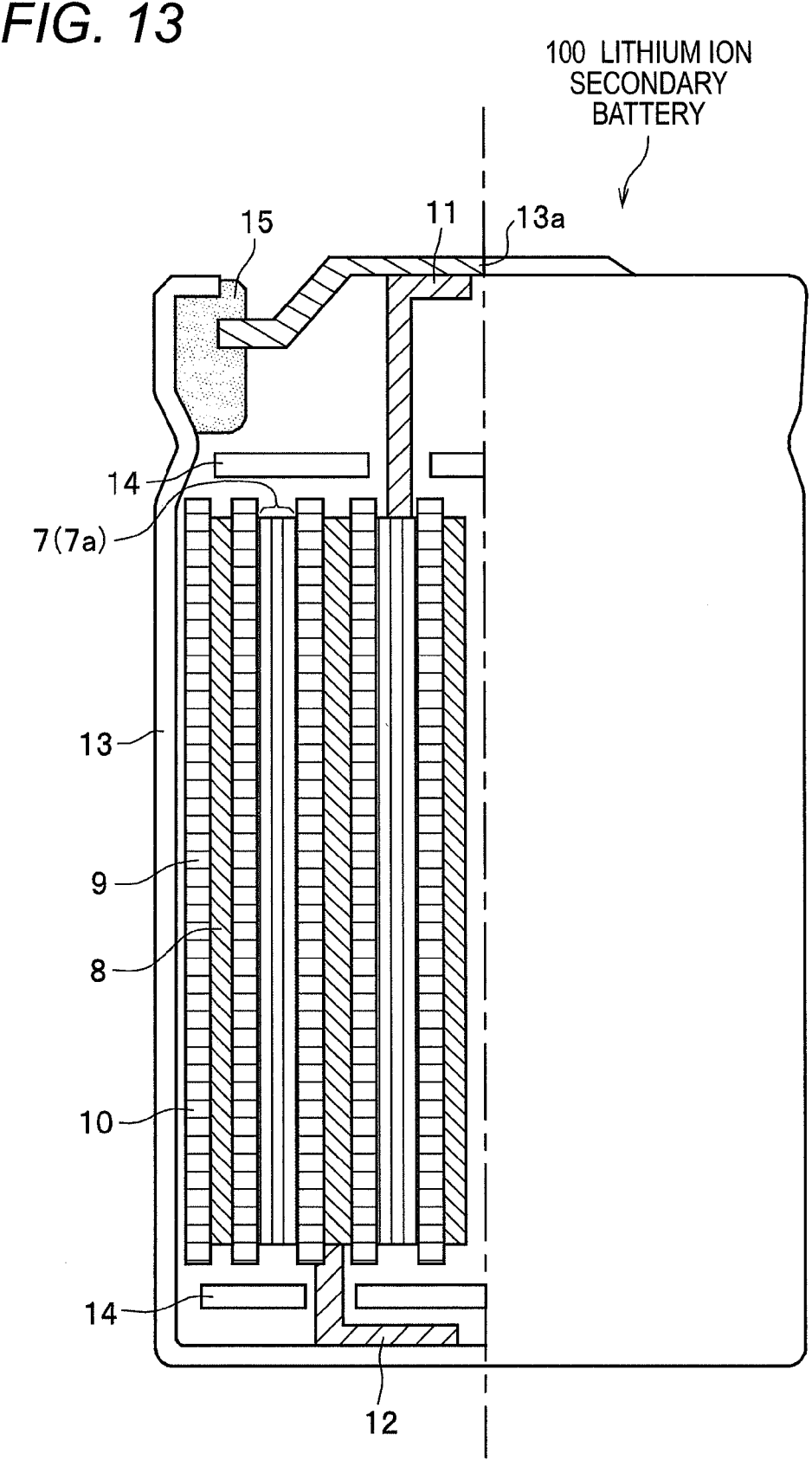
FIG. 13 is a partial cross sectional view of a lithium ion secondary battery to which a positive electrode according to the present embodiment is applied.

Next, a configuration of a lithium ion secondary battery to which the positive electrodes 7a and 7b are applied will be described with reference to FIG. 13. Although details will be described below, a lithium ion secondary battery 100 illustrated in FIG. 13 is obtained by winding the sheet positive electrode 7a illustrated in FIG. 1 around a core member. Note that, for ease of description, the above-described positive electrode 7a is applied as the positive electrode 7 illustrated in FIG. 13. However, the positive electrode 7b is also similarly applicable.

As illustrated in FIG. 13, the lithium ion secondary battery 100 (hereinafter, simply described as "battery 100") includes the positive electrode 7 (positive electrode 7a), the negative electrode 8, the separator 9 lying between the positive electrode 7 and the negative electrode 8, and a nonaqueous electrolyte (not illustrated) including a lithium salt. The battery 100 has a cylindrical shape, but the battery 100 may be a square type battery, a laminate type battery, or the like.

As described above, the separator 9 is disposed between the positive electrode 7 and the negative electrode 8. This can avoid a contact (short circuit) between the positive electrode 7 and the negative electrode 8. Since the battery 100 has a cylindrical shape, the positive electrode 7, the separator 9, and the negative electrode 8 are layered in this order and are wound around a core member (not illustrated), whereby the battery 100 can be formed into the shape illustrated in FIG. 13.

The negative electrode 8 can occlude/discharge the lithium ions. Further, any negative electrode 8, separator 9, nonaqueous electrolyte, and lithium salt can be used, and thus detailed description is omitted.

Further, the battery 100 includes a positive electrode plate lead piece 11, a negative electrode lead piece 12, a battery can 13, a sealed cover part 13a, an insulating plate 14, and a packing 15. The battery can and the sealed cover part 13a are configured from stainless steel (SUS), or the like.

The positive electrode plate lead piece 11 electrically connects the positive electrode 7 and the sealed cover part 13a. This enables the battery cover part 13a to function as a positive electrode of the battery 100. Further, the negative electrode lead piece 12 electrically connects the negative electrode 9 and a bottom part of the battery can 13. This enables a main body of the battery can 13 (to be specific, the bottom part of the battery can 13) to function as a negative electrode of the battery 100. Note that the battery can 13 and the sealed cover part 13a are electrically insulated by the packing 15.

As described above, the battery 100 includes the positive electrode capable of occluding/discharging the lithium ions, the negative electrode capable of occluding/discharging the lithium ions, and the nonaqueous electrolyte including a lithium salt, and thus has a configuration capable of being reversibly charged/discharged. The battery 100 is a long-life and high-capacity lithium ion secondary battery in which the positive electrode active material is not peeled from the electrode plate, and the deterioration of the positive electrode active material is suppressed, even if the charging/discharging is repeated.

REFERENCE SIGNS LIST 1 positive electrode metal foil (metal plate)
2 lattice spacing control film (metal film)
3 positive electrode active material layer (positive electrode active material)
4 lattice spacing control film (metal film)
5 positive electrode active material layer (positive electrode active material)
7 positive electrode
7a positive electrode
7b positive electrode
8 negative electrode
9 separator
100 lithium ion secondary battery (battery)

The invention claimed is:
1. A lithium ion secondary battery including a positive electrode capable of occluding and discharging lithium ions, a negative electrode capable of occluding and discharging lithium ions, and a nonaqueous electrolyte including a lithium salt, and capable of being reversibly charged/discharged, wherein
the positive electrode includes a metal plate, a metal film formed on a surface of the metal plate, and a positive electrode active material,
the metal film includes one or more metals having a (111) orientation selected from a group consisting of ruthenium, osmium, and palladium,
the positive electrode active material is a compound expressed by an expression (1) below:

$$\text{LiCo}_x\text{Ni}_{1-x}\text{O}_2 \text{ (where } 0 \leq x \leq 1\text{)} \tag{1}$$

and is epitaxially grown and formed on a surface of the metal film,
the positive electrode active material is formed such that the c axis of a crystal structure of the positive electrode active material is perpendicular to the metal film and
a cobalt layer of the positive electrode active material is compressed and the metal, in which lattice mismatch is negative, is applied to the metal film whereby lattice spacing of the positive electrode active material in a c-axis direction has an enlargement ratio of 2% or more.

2. The lithium ion secondary battery according to claim 1, wherein lattice mismatch between the metal film and the positive electrode active material is 7% or less.

3. The lithium ion secondary battery according to claim 1, wherein x=1 in the expression (1).

4. The lithium ion secondary battery according to claim 1, wherein the metal film is formed by one of vacuum deposition, sputtering or chemical vapor deposition.

5. A lithium ion secondary battery including a positive electrode capable of occluding and discharging lithium ions, a negative electrode capable of occluding and discharging lithium ions, and a nonaqueous electrolyte including a lithium salt, and capable of being reversibly charged/discharged, wherein the positive electrode includes a metal plate, a metal film formed on a surface of the metal plate, and a positive electrode active material, the metal film includes a metal having a (110) orientation selected from the group consisting of silver and aluminum, the positive electrode active material is a compound expressed by an expression (2) below:

$$LiCo_yNi_{1-y}O_2 \text{ (where } 0 \leq y \leq 1) \tag{2}$$

and is epitaxially grown and formed on a surface of the metal film, the positive electrode active material is formed such that a c axis of a crystal structure of the positive electrode active material is parallel with the metal film, and a cobalt layer of the positive electrode active material is compressed and the metal, in which lattice mismatch is negative, is applied to the metal film whereby lattice spacing of the positive electrode active material in a c-axis direction has an enlargement ratio of 2% or more.

6. The lithium ion secondary battery according to claim 5, wherein lattice mismatch between the metal film and the positive electrode active material is 7% or less.

7. The lithium ion secondary battery according to claim 5, wherein y=1 in the expression (2).

8. The lithium ion secondary battery according to claim 2, wherein the metal film is formed by one of vacuum deposition, sputtering or chemical vapor deposition.

9. A lithium ion secondary battery including a positive electrode capable of occluding and discharging lithium ions, a negative electrode capable of occluding and discharging lithium ions; and a nonaqueous electrolyte including a lithium salt, and capable of being reversibly charged/discharged, wherein the positive electrode includes a metal plate, a metal film formed on a surface of the metal plate, and a positive electrode active material, the metal film includes silver having a (110) orientation, the positive electrode active material is a compound expressed by an expression (2) below:

$$LiCo_yNi_{1-y}O_2 \text{ (where } 0 \leq y \leq 1) \tag{2}$$

and is epitaxially grown and formed on a surface of the metal film, the positive electrode active material is formed such that a c axis of a crystal structure of the positive electrode active material is parallel with the metal film, and a cobalt layer of the positive electrode active material is compressed and the metal in which lattice mismatch is negative is applied to the metal film whereby lattice spacing of the positive electrode active material in a c-axis direction has an enlargement ratio of 2% or more.

10. The lithium ion secondary battery according to claim 9, wherein lattice mismatch between the metal film and the positive electrode active material is 7% or less.

11. The lithium ion secondary battery according to claim 9, wherein y=1 in the expression (2).

12. The lithium ion secondary battery according to claim 9, wherein the metal film is formed by one of vacuum deposition, sputtering or chemical vapor deposition.

* * * * *